US008054330B2

(12) United States Patent (10) Patent No.: US 8,054,330 B2
Shu et al. (45) Date of Patent: *Nov. 8, 2011

(54) APPARATUS AND METHODS FOR ESTABLISHING AND MANAGING A DISTRIBUTED, MODULAR AND EXTENSIBLE VIDEO SURVEILLANCE SYSTEM

(75) Inventors: Chiao-Fe Shu, Yorktown Heights, NY (US); Arun Hampapur, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

This patent is subject to a terminal disclaimer.

(21) Appl. No.: 10/966,630

(22) Filed: Oct. 14, 2004

(65) Prior Publication Data

US 2006/0077254 A1 Apr. 13, 2006

Related U.S. Application Data

(60) Provisional application No. 60/618,342, filed on Oct. 12, 2004, provisional application No. 60/618,095, filed on Oct. 12, 2004.

(51) Int. Cl.
*H04N 7/12* (2006.01)
(52) U.S. Cl. ......... 348/143; 348/159; 348/161; 382/103
(58) Field of Classification Search ................... 348/143, 348/159, 161; 382/103
See application file for complete search history.

(56) References Cited

U.S. PATENT DOCUMENTS

| 5,969,755 | A | * | 10/1999 | Courtney | 348/143 |
| 6,271,752 | B1 | | 8/2001 | Vaios | 340/541 |
| 6,476,857 | B1 | | 11/2002 | Agatsuma et al. | 348/152 |
| 6,583,813 | B1 | * | 6/2003 | Enright et al. | 348/150 |
| 6,697,105 | B1 | | 2/2004 | Kato et al. | 348/211.6 |
| 2004/0080615 | A1 | | 4/2004 | Klein et al. | 348/143 |
| 2005/0132414 | A1 | | 6/2005 | Bentley et al. | 725/105 |
| 2006/0072013 | A1 | * | 4/2006 | Renkis | 348/156 |

FOREIGN PATENT DOCUMENTS

CN 1413030 A 4/2003

OTHER PUBLICATIONS

"A Distributed Surveillance System for Improving Security in Public Transport Networks", Velastin et al., Measurement and Control, Special Issue on Remote Surveillance, vol. 35, No. 8, Sep. 2002, pp. 209-213.
Collins, et al., "A System for Video surveillance and Monitoring", Carnegie Mellon University, (2000), (68 pages).

* cited by examiner

*Primary Examiner* — Jay Patel
*Assistant Examiner* — Geepy Pe
(74) *Attorney, Agent, or Firm* — Harrington & Smith

(57) ABSTRACT

Systems and methods are disclosed for implementing and managing distributed video surveillance systems. Systems and methods in accordance with the present invention provide a well-organized structure for describing and implementing distributed video surveillance systems and service protocols for managing the surveillance activities of clusters of video surveillance cameras. In particular, the service protocols provide a high degree of control over the surveillance activities of video surveillance cameras. In addition, the service protocols also provide a great deal of flexibility in selecting and managing a wide range of analytical and managerial tools for available for analyzing and organizing video track information.

53 Claims, 12 Drawing Sheets

CLUSTER-CAMERA OPERATIONS

ADD CAMERA TO CLUSTER — 710

NAME CAMERA — 712

DELETE CAMERA FROM CLUSTER — 714

FIG.9

APPARATUS AND METHODS FOR ESTABLISHING AND MANAGING A DISTRIBUTED, MODULAR AND EXTENSIBLE VIDEO SURVEILLANCE SYSTEM

CROSS REFERENCE TO RELATED APPLICATIONS

This application hereby claims priority from provisional U.S. Patent Application Nos. 60/618,095 and 60/618,342 both filed on Oct. 12, 2004 and assigned to the same assignee as the present application. These provisional applications are hereby incorporated by reference in their entirety as if fully restated herein. This application is also related to U.S. patent application Ser. No. 10/967,048 filed on even date and assigned to the same assignee as the present application. U.S. patent application Ser. No. 10/967,048 is also incorporated by reference as if fully restated herein.

TECHNICAL FIELD

The present invention generally concerns video surveillance systems and more particularly concerns systems and methods for implementing and managing large scale systems of distributed video surveillance assets.

BACKGROUND

In the present environment of heightened concern over criminal and terrorist activities, those knowledgeable in the art of video surveillance technology have rapidly recognized the limitations of current systems, particularly in the face of a widespread threat environment where events may be rare but highly catastrophic. In addition, those skilled in the art also recognize the value of surveillance-derived information for business purposes, for example, arrival-departure times; retail browsing activities; or traffic patterns.

Present video surveillance systems have limited abilities to respond to current and foreseeable needs. In particular, present video surveillance systems are often an amalgam of video surveillance assets with little flexibility in implementation and a strong resistance to centralized, remote management. The lack of flexibility in implementation is a consequence of the heretofore ad-hoc approach to construction of video surveillance systems. In the prior art, the approach has been to integrate relatively low-tech surveillance assets, for example, video cameras, in "custom" surveillance suites tailored to a particular threat environment. This approach may result in somewhat sophisticated surveillance capabilities, but important and crucial limitations become apparent as soon as a government or large corporation tries to spawn an existing security solution to numerous sites with diverse and sometimes conflicting security concerns.

As a result, the government or corporation is often faced with a start-from-scratch situation where a new and unique surveillance system has to be constructed for each installation where surveillance capability is desired. Due to the relatively limited number security professionals and the long time line associated with implementation of custom video surveillance systems, the net result is that surveillance capability has to be rationed in the near to intermediate term, with the logical consequence that certain installations have to make due with limited or no video surveillance capability. Obviously, in the present increased threat environment, such delay can have tragic and even horrific consequences.

Another problem associated with current video surveillance systems is their resistance to centralized management. Since many existing video surveillance systems are ad-hoc in nature, they naturally suffer from a lack of commonality. This means that a government or large corporation seeking to implement a centralized and top-down approach to management of video surveillance systems is confronted by a collection of unique surveillance suites with, for example, differing control protocols; capabilities; and data formats each of which may be managed easily on-site, but, when taken together, are nearly impossible to manage as an entity from a remote locale.

Accordingly, those skilled in the art desire improvements to existing video surveillance technology. In particular, those skilled in the art desire building blocks (for example, video cameras) with a higher degree of inherent programmability. Such programmability would result in numerous improvements to the implementation time cycle. By providing a wide range of inherent capability subject to programming control, the need for time-consuming ad-hoc implementations would be greatly reduced. Instead, with such building blocks, security professionals can rapidly implement the rough outline of a video surveillance system, and then quickly refine the operation of the system through centralized programming control.

Additionally, those skilled in the art desire a set of common control protocols for controlling and managing the activities of a distributed video surveillance system. This is necessary for several reasons. First, since present video surveillance systems are often ad-hoc and unique, there is no known set of management protocols for managing a distributed video surveillance system comprised of highly programmable building blocks. Second, since the component elements of the surveillance system will be highly programmable and easily subject to centralized control, management protocols that take advantage of these features are required.

SUMMARY OF THE PREFERRED EMBODIMENTS

The foregoing and other problems are overcome, and other advantages are realized, in accordance with the presently preferred embodiments of these teachings. The present invention comprises methods and apparatus for establishing and managing a remote, distributed, modular and extensible video camera surveillance system.

In particular, a first alternate embodiment of the present invention comprises a video surveillance system module comprising: a video surveillance camera, where the video surveillance camera is remotely programmable; a video encoder to encode video gathered by the video surveillance camera; and a video analysis engine coupled to the video surveillance camera to analyze video gathered by the video surveillance camera and to create data derived from analysis of the video.

A second alternate embodiment of the present invention comprises at least one video surveillance system module, the video surveillance system module comprising: a video surveillance camera, wherein the video surveillance camera is remotely programmable; a video encoder to encode video gathered by the video surveillance camera; and a video analysis engine coupled to the video surveillance camera to analyze video gathered by the video surveillance camera and to create data derived from analysis of the video.

A third alternate embodiment of the present invention comprises a video surveillance camera cluster for incorporation in a video surveillance camera system, the video surveillance camera cluster comprising: a unique identifier for use by the video surveillance system to identify the video surveillance camera cluster; at least one video surveillance system module, the video surveillance system module comprising: a video surveillance camera, wherein the video surveillance camera is remotely programmable; a video encoder to encode video gathered by the video surveillance camera; and a video analysis engine coupled to the video surveillance camera to analyze video gathered by the video surveillance camera and to create data derived from analysis of the video.

A fourth alternate embodiment of the present invention comprises a video surveillance camera system front end comprising: at least one video surveillance system module, the video surveillance system module comprising: a video surveillance camera, wherein the video surveillance camera is remotely programmable; a video encoder to encode video gathered by the video surveillance camera; and a video analysis engine coupled to the video surveillance camera to analyze video gathered by the video surveillance camera and to create data derived from analysis of the video; at least one video surveillance system network coupled to the at least one video surveillance system module; and a remote video surveillance system control interface coupled to the at least one video surveillance system network for controlling the operations of the at least one video surveillance system module.

A fifth alternate embodiment of the present invention comprises a signal-bearing medium tangibly embodying a program of machine-readable instructions executable by a digital processing apparatus of a computer system to perform operations comprising establishment and management of a video surveillance system, the operations comprising: establishing at least one video surveillance camera cluster comprised of at least one programmable video surveillance camera by assigning unique identifiers to the at least one video surveillance camera cluster and the at least one video surveillance camera comprising the video surveillance camera cluster, wherein the unique identifiers will be used in an electronic database system for managing operations of the video surveillance camera cluster and the at least one video surveillance camera comprising the video surveillance camera cluster; programming the at least one video surveillance camera comprising the video surveillance camera cluster; assigning a unique identifier to video data gathered by the at least one video surveillance camera comprising the video surveillance camera cluster, wherein the unique identifier will be used by the database system to catalogue video data gathered by the at least one video surveillance camera when saving the video data for later retrieval; and selecting at least one video analysis operation to be performed on video data gathered by the at least one video surveillance camera comprising the video surveillance camera cluster.

Thus it is seen that embodiments of the present invention overcome the limitations of the prior art. In particular, foregoing prior art video surveillance suites were often ad-hoc in nature and not easily extensible. In contrast, the methods and apparatus of the present invention greatly simplify the establishment, implementation and management of a distributed, modular and extensible video surveillance system.

For example, the video surveillance system module of the present invention greatly simplifies the establishment of the rough outlines of a video surveillance system. This is accomplished through both the modularity and the programmability of the video surveillance system module. A user need merely establish the desired locations for video surveillance cameras, then wire (by, for example, using a video surveillance system network) the desired location to accept a video surveillance system module, and next plug the video surveillance system module into, for example, the video surveillance system network. Since the video surveillance camera and video analysis engine are highly and remotely programmable, an installation technician need not spend time at each camera location setting the camera movements; instead the installation technician can access and program both the video surveillance camera and the video analysis engine remotely over the network. This functionality is particularly useful in situations where multiple cameras are used to observe a single location; the remote programmability of the video cameras quickly enables an installation technician to optimize the solution.

Another advantage of the present invention is the modularity of intermediate levels of the video surveillance system represented by video surveillance camera clusters. The ability to associate a bank of video surveillance system modules in a uniquely-identifiable video surveillance camera cluster greatly simplifies management of a distributed video surveillance system, since video surveillance camera clusters will be associated with particular building locations; entrances; or addresses. This enables a surveillance technician monitoring a group of clusters to rapidly develop a holistic view of the physical environs being monitored. In addition, the modularity represented by the clusters greatly simplifies expanding a distributed video surveillance system since it occurs within a systematic framework which uniquely identifies both the video surveillance system assets and the data being generated by the video surveillance system.

A further advantage of the present invention is the suite of service and management protocols available to a user. The breadth of the available management protocols greatly simplify the achievement of a fine degree of control over the video surveillance system being managed.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 9 depicts specific cluster-camera-related service protocols available for implementing and managing a modular and extensible video surveillance system in accordance with the present invention;

DETAILED DESCRIPTION OF THE PREFERRED EMBODIMENTS

Figure 1A:
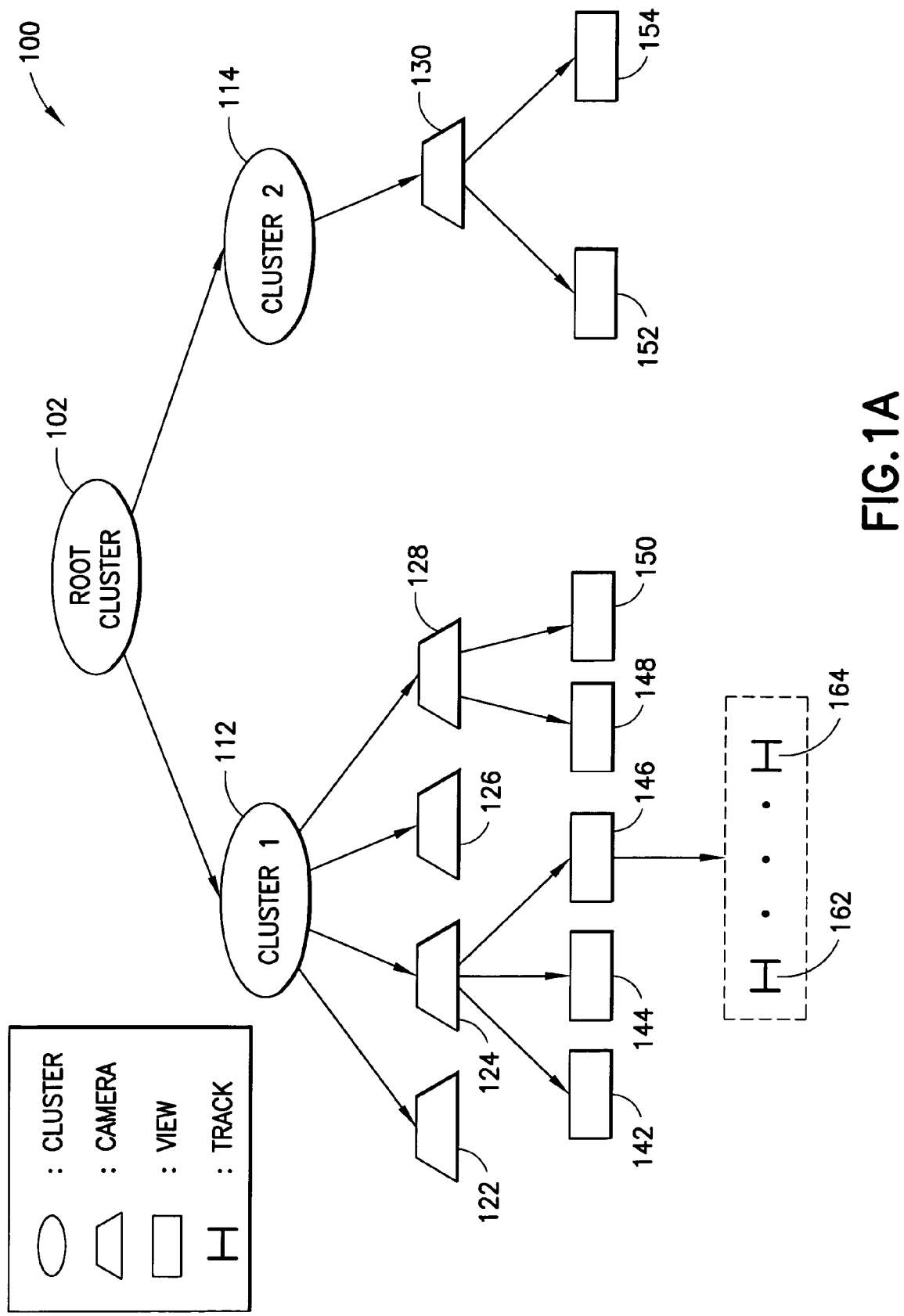
FIG. 1A depicts a block diagram of a front end of an electronic video surveillance camera system organized in relation to video surveillance cameras comprising the video surveillance camera system and made in accordance with the present invention.

Particular embodiments and features of the present invention are illustrated in the schematic block diagrams depicted in FIGS. 1-5. The block diagram in FIG. 1A depicts a portion of a video surveillance system front end 100 comprised of a root video surveillance cluster 102, which is in turn comprised of individual video surveillance camera clusters 112, 114. Each cluster 112, 114 is in turn comprised of at least one video surveillance camera; for example, cluster 1 comprises four video surveillance cameras 122, 124, 126, 128, while cluster 114 comprises one video surveillance camera 130.

Individual cameras comprising the video surveillance camera clusters are preferably highly programmable with programmable pan, tilt, zoom and digital zoom features. The individual cameras also have view-programming capability, wherein a view comprised of a specific set of operations or movements selected from at least one of the pan, tilt, zoom or digital zoom options are programmed into a sequence of operations or movements. In certain embodiments, each camera may have multiple programmed views as illustrated by camera 124 in FIG. 1A, which has views 142, 144, and 146, camera 128 which has views 148 and 150; and camera 130 which has views 152 and 154.

In addition to view programming, the video corresponding to a particular view 146 gathered by a video surveillance camera 124 is analyzed by a video analysis engine 214 according to one or more user-specified criteria. The video analysis 214 engine creates track information 162, 164 by analyzing the video gathered by the video surveillance cameras, for example, video surveillance camera 124. As is shown in FIG. 1A, the video analysis occurs on a specific view 146 of video surveillance camera 124. The track information comprises at least a pointer to video satisfying the user-specified criteria. For example, if the criteria correspond to the event of an automobile entering the view of the camera, the video analysis engine will create track information comprising at least a pointer to each segment of video recording the occurrence of an automobile entering the field of view.

Figure 1B:
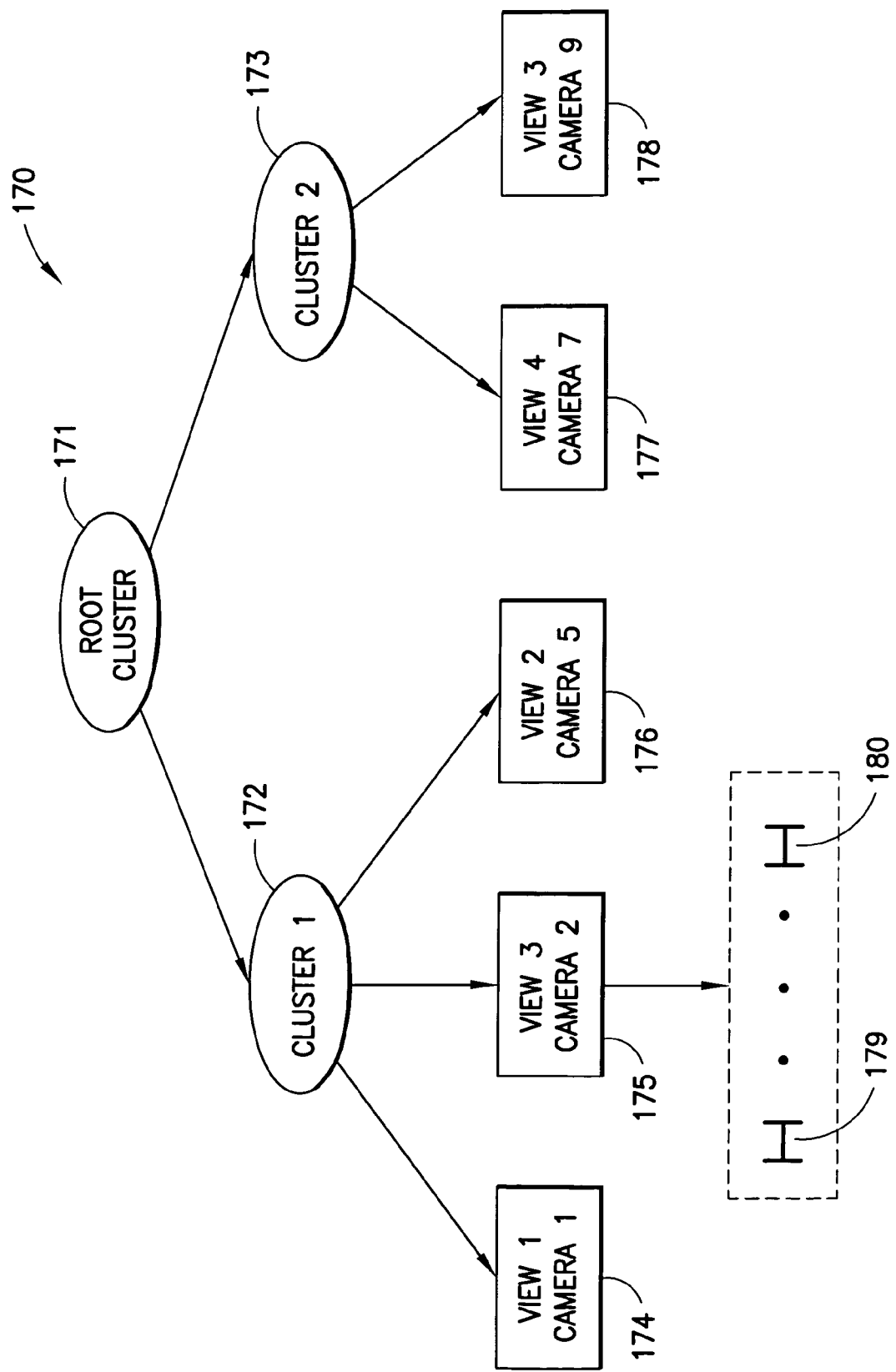
FIG. 1B depicts a block diagram of a front end of a video surveillance camera system organized in relation to programmed views of video surveillance cameras comprising the video surveillance camera system and made in accordance with the present invention.

In contrast to the embodiment depicted in FIG. 1A, the embodiment depicted in FIG. 1B is organized in clusters of programmed camera views. As in the case of the embodiment depicted in FIG. 1A, the video surveillance camera front end 170 comprises a root cluster 171 further comprised of clusters 172 and 173. Each of the clusters 172, 173 is comprised of programmed camera views selected from different cameras. For example, cluster 172 is comprised of a view 1 (174) selected from camera 1; view 3 (175) selected from a camera 2; and a view 2 (176) selected from a camera 5; and cluster 173 is comprised of a view 4 (177) from a camera 7 and a view 3 from a camera 9. In addition, video analysis operations can be applied to a cluster of views, or to individual views comprising the cluster. View 3 from camera 2 (175) generates tracks 179, 180. Further, data and alarm conditions derived from video analysis applied to a cluster of views can be reported from a cluster-centric perspective.

This feature illustrates a particular advantage of the present invention in that video surveillance and analysis activities can be easily and continually customized to a particular threat environment. A video surveillance analyst is not confronted with a situation as in the case of the prior art where video surveillance options were predetermined at the establishment of the video surveillance system; rather, when practicing the methods and apparatus of the present invention the video surveillance analyst can continually adjust the system to evolving threat situations.

Figure 2:
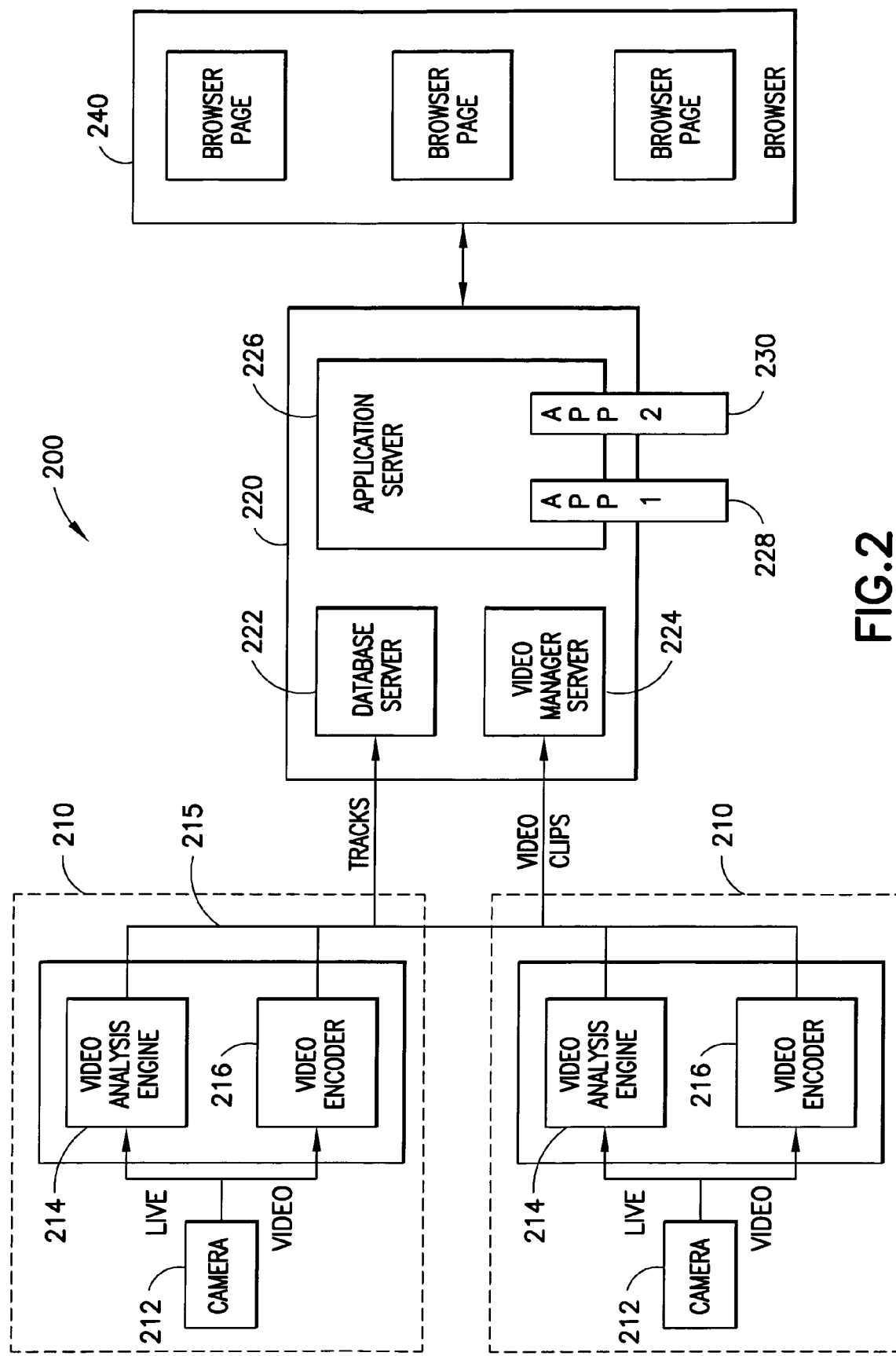
FIG. 2 depicts the data flow architecture of a distributed video surveillance camera system made in accordance with the present invention.
Figure 3:
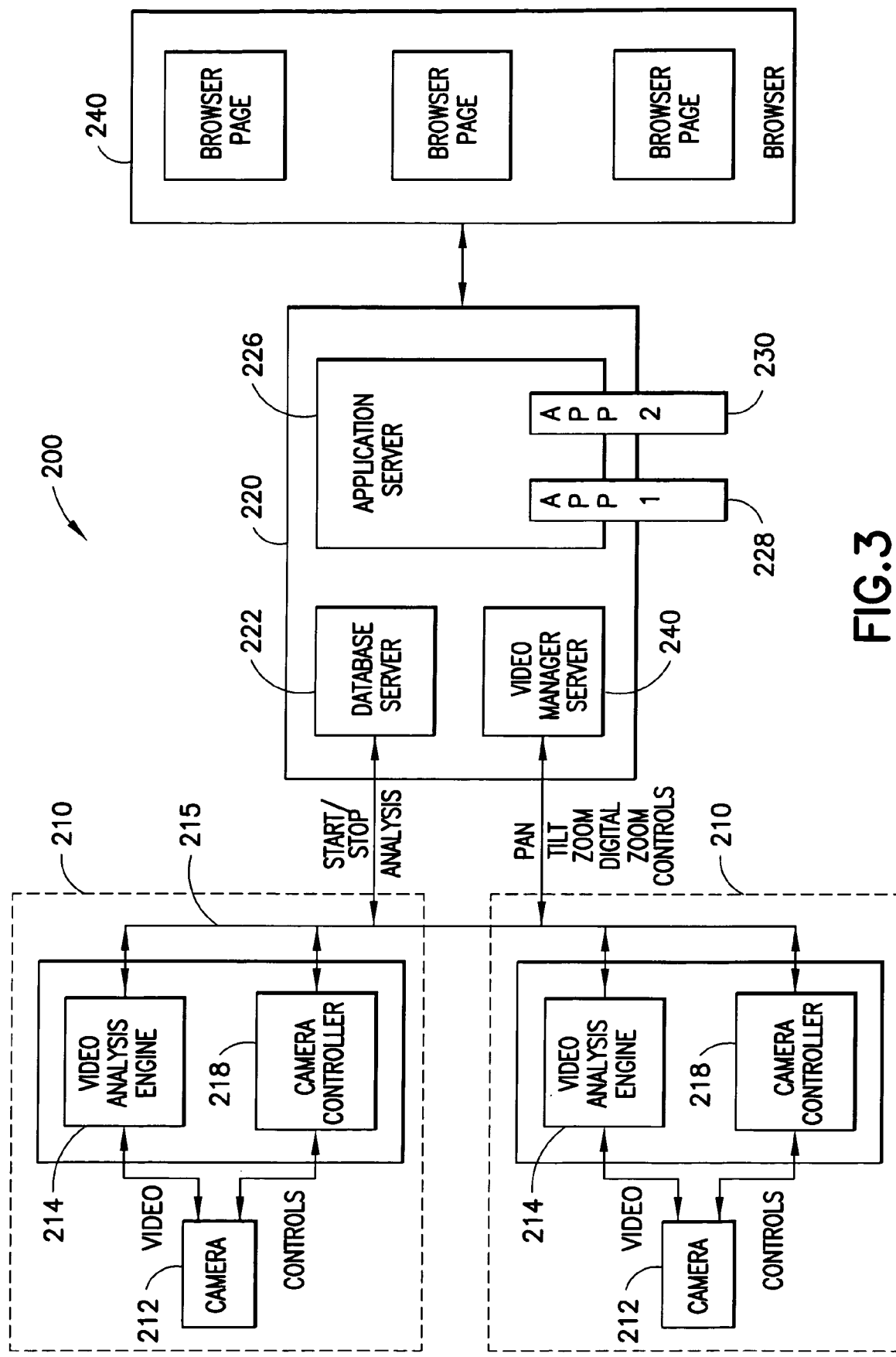
FIG. 3 depicts the control flow architecture of a distributed video surveillance camera system made in accordance with the present invention.

FIG. 2 depicts data management details and FIG. 3 depicts control management details of a video surveillance system 200 made in accordance with the present invention. In particular, video surveillance system 200 comprises, in part, multiple video surveillance system modules 210 comprising video cameras 212; video analysis engines 214; video encoders 216; and camera controllers 218. At least one video surveillance system module comprises a video surveillance camera cluster in the embodiment depicted in FIGS. 2 and 3. The video surveillance system modules 210 are a particular advantage of the present invention because they provide a high degree of programmability, modularity, flexibility and extensibility. Each video surveillance camera 212 in a video surveillance system module is remotely programmable through camera controller 218. In addition, the video analysis engine 214 is remotely programmable, permitting a user to specify video analysis criteria remotely. In the data flow depicted in FIG. 2, data derived from the analysis of video gathered by the video surveillance cameras 212 is transmitted by the video analysis engine to the electronic database system 220 over a video surveillance system network 215.

A unitary system network 215 is depicted in FIGS. 2 and 3, but in various alternate embodiments of the present invention the video surveillance system network can be segmented into various component networks operating in accordance with various protocols. For example, portions of the video surveillance system network can be hard-wired while other portions can be wireless. In addition, different wired and wireless network protocols can be used at various levels of the system.

The electronic database system 220 comprises a database server 222 for receiving and cataloguing data generated by the video analysis engines 214; a video manager for receiving video encoded by video encoders 216; and an application server 226 for managing video surveillance applications. In the particular embodiment depicted in FIGS. 2 and 3 both implementation and management of the video surveillance system 200, and video surveillance activities are managed through the electronic database system 220 of the video surveillance system 200. In alternate embodiments, these activities can be managed through separate instrumentalities.

In addition, the database system is depicted in FIGS. 2 and 3 as integrating both a database server 222 and video manager 224. In alternate embodiments, these can be separated; and in still other embodiments there may be multiple database servers 222 and video managers 224 in a large-scale distributed video surveillance system operating in accordance with the present invention. In fact, the use of globally-unique identifiers for identifying video surveillance camera clusters; video surveillance cameras; video surveillance camera views and track information greatly reduces database management overhead since there is no need to centrally manage identification activities, and makes it possible to implement a distributed video surveillance system.

In the embodiment depicted in FIGS. 2 and 3 two applications 228 and 230 interact with the video surveillance system 200 through the electronic database system 220. In particular, application 228 is a control application for implementing and managing the video surveillance system, while application 230 is a surveillance application for controlling surveillance activities accomplished using the video surveillance system 200. For example, in various embodiments, the surveillance application 230 would automatically disseminate video and data gathered by the video surveillance system 200 to video surveillance analysts performing surveillance activities. In other embodiments, the surveillance application would receive queries of the electronic database system 200 formulated by the video surveillance analysts; locate the data and video satisfying the queries, and display the data and video in browser format 240 as shown in FIGS. 2 and 3. In further embodiments, the surveillance application 230 would generate alarm conditions for alerting the video surveillance analysts performing video surveillance activities. These various options can also be simultaneously available in a single embodiment.

Particular advantages of the methods and apparatus of the present invention are apparent in FIGS. 2 and 3. For example, video analysis can be performed continuously by the video analysis engines 214, thereby creating a rich database of object and event data that can be accessed either in near-real-time in aid of, for example, policing activities, or much later in aid of investigative activities. In addition, it is apparent the simplicity with which a video surveillance system having the architecture depicted in FIGS. 2 and 3 can be extended through the addition of modular video surveillance system modules 210. This is further eased by the assigning of unique identifiers to video surveillance camera clusters; video surveillance cameras; and video surveillance camera views. The assignment of unique identifiers aids not only in the cataloguing and archiving of data and video in the electronic database system 220, but also in the development of situational awareness by video surveillance analysts whose awareness is increased through the association of video surveillance cameras and views with unique identifiers.

In addition, the unique identifiers assigned to the clusters, cameras and views can also function as web address in a web-based system, greatly simplifying interactions with the electronic video surveillance system. For example, if a video surveillance analyst desired to see a live feed associated with a particular camera view, the analyst need merely enter the address of the camera view using the unique identifier to form a portion of the address to access the camera view.

Figure 4:
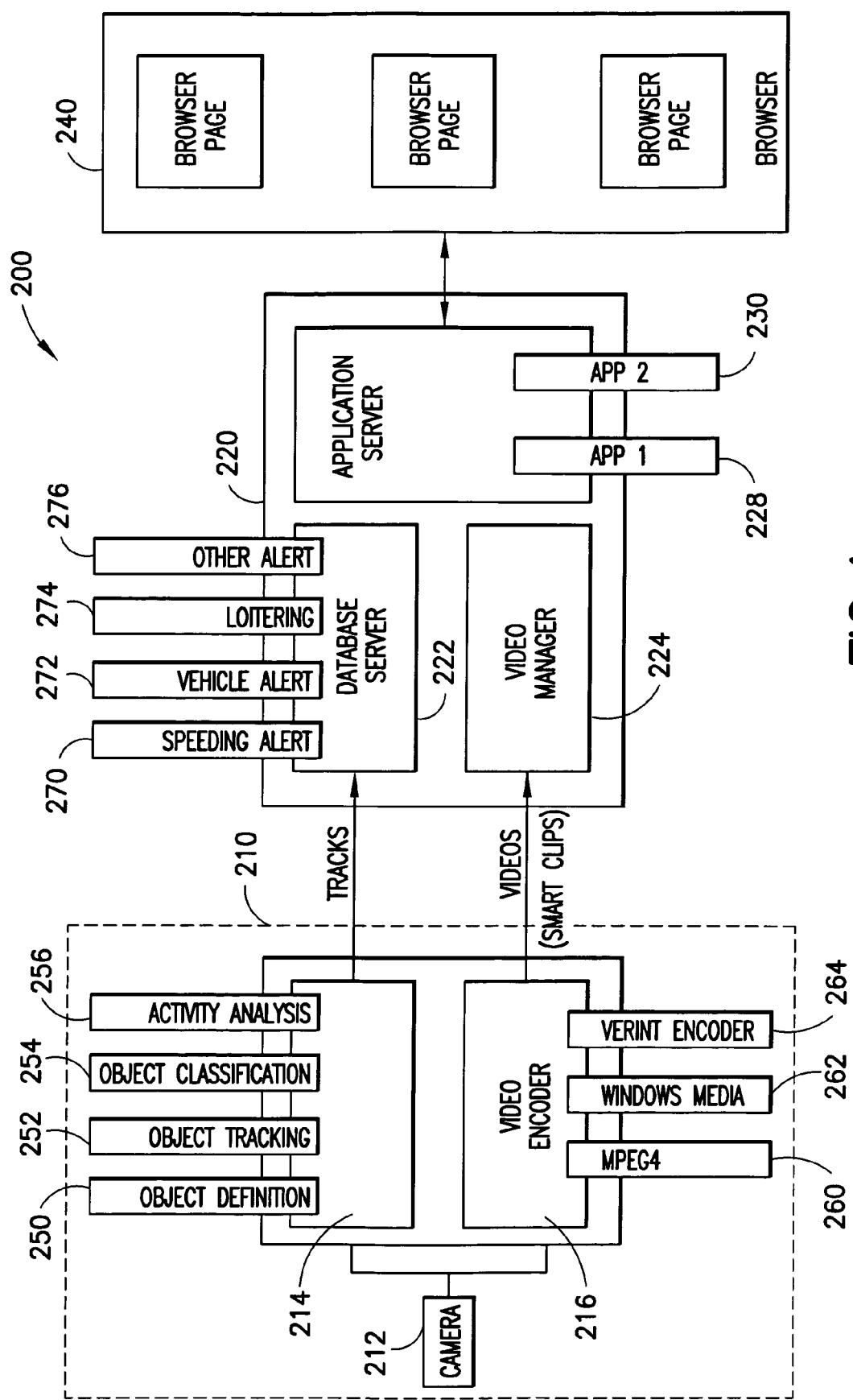
FIG. 4 depicts the data flow architecture of an alternate distributed video surveillance camera system made in accordance with the present invention.

An alternate video surveillance system operating in accordance with the methods and apparatus of the present invention is depicted in FIG. 4. In FIG. 4, the video analysis engine 214 is programmed with an object detection application 250 to perform object detection; an object tracking application 252 to perform object tracking; an object classification application 254 to perform object classification; and an activity analysis application 256 to perform activity analysis. In the embodiment depicted in FIG. 4, the analysis activities are applied to video gathered from a single video surveillance camera 212, illustrating that multiple video analysis activities can be simultaneously applied to the video.

The video encoder 216 comprises multiple video encoding applications, providing a wide range of options for video surveillance analysts using the video surveillance system. In particular, video encoder 216 comprises an MPEG4 encoder 260; a Windows Media encoder 262; and a Verint Encoder 264.

The database server 222 depicted in FIG. 4 is programmed to perform various alerts in response to data received from the video analysis engine 214. For example, the programming of the database server comprises a speeding alert application 270 to issue speeding alerts; a vehicle alert application 272 to issue vehicle alerts; a loitering application 274 to issue loitering alerts; and another application 276 to issue other alerts. In other embodiments (for example, those depicted in FIGS. 2-3) alarms can also be implemented locally to be performed by at least one of the video analysis engines 214.

Figure 5:
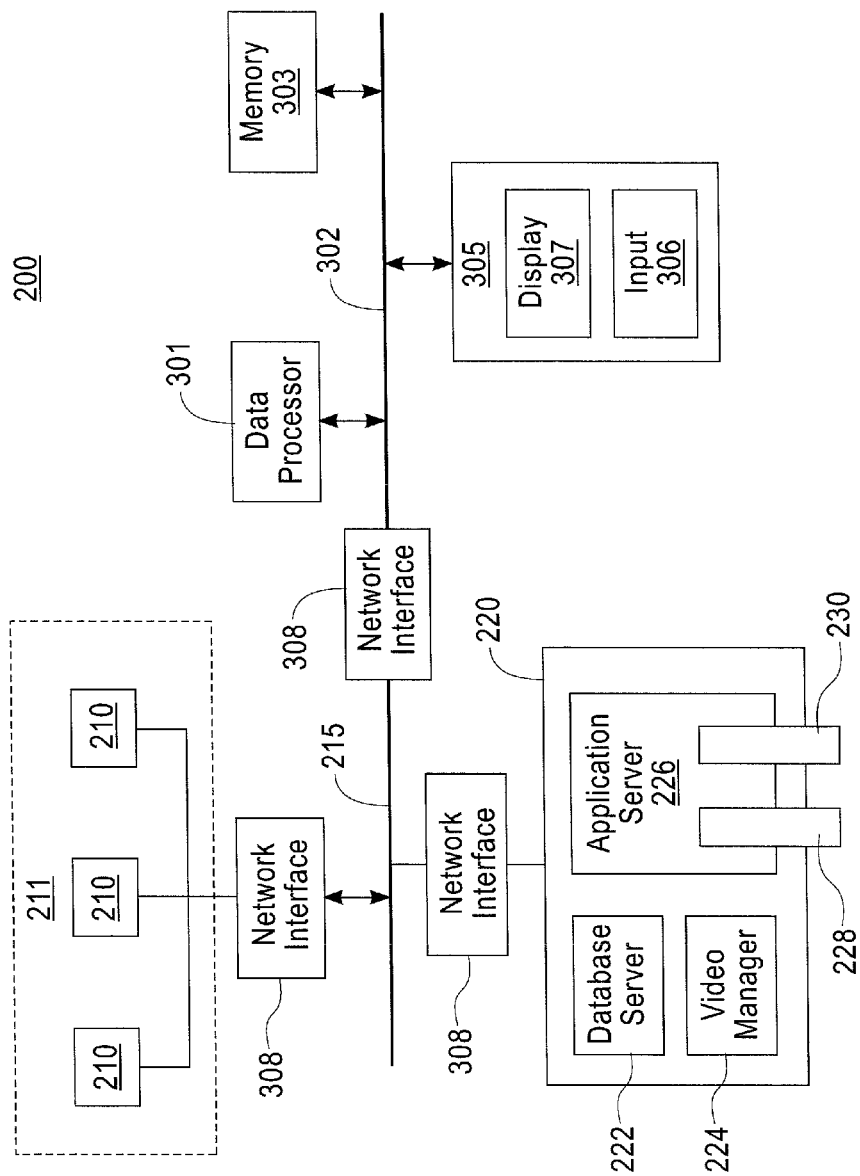
FIG. 5 depicts an alternate video surveillance system architecture made in accordance with the present invention.

Additional details of a video surveillance system 200 made in accordance with the present invention are depicted in the conceptual block diagram depicted in FIG. 5. The video surveillance system 200 includes at least one data processor 301 coupled to at least one system bus 302 through which the data processor 301 may address a memory sub-system 303, also referred to herein simply as the memory 303. The memory 303 may include RAM, ROM and fixed and removable disks and/or tape. The memory 303 is assumed to store at least one program comprising instructions for causing the data processor 301 to execute methods in accordance with the teachings of the invention. The data processor 301 is also coupled through the bus 302 to a user interface, preferably a graphical user interface ("GUI") 305 that includes a user input device 306, such as one or more of a keyboard, a mouse, a trackball, a voice recognition interface, as well as a user display device 307, such as a high resolution graphical CRT display terminal, an LCD display terminal, or any suitable display device. With these input/output devices, a user can perform the steps of the methods of the present invention where user-specified values are required.

The data processor 301 may also be coupled through the bus 302 to a network interface 308 that provides bidirectional access to the video surveillance system network 215, such as an intranet and/or the internet. In various embodiments of the present invention, both system implementation and management, as well as surveillance activities can be performed through the display 307 and input devices 306.

In general, these teachings may be implemented using at least one software program running on a personal computer, a server, a microcomputer, a mainframe computer, a portable computer, an embedded computer, or by any suitable type of programmable data processor 301 operating in combination with video surveillance system management application 228 and video surveillance application 230 residing on the electronic database system 200. A video surveillance system technician can also manage the video surveillance system modules 210 comprising at least one video surveillance camera cluster 211 through the display 305 and input device 306.

One of the advantages of the present invention is the ease in which a distributed video surveillance system can be quickly and easily constructed. This is the result of the modular concept embodied in the system, reflected in FIGS. 3-5, wherein the firmware and software for establishing and managing the video surveillance system are designed to operate with video surveillance cameras having a high degree of programmability and video analysis engines providing a wide range of video analytics.

Figure 6:
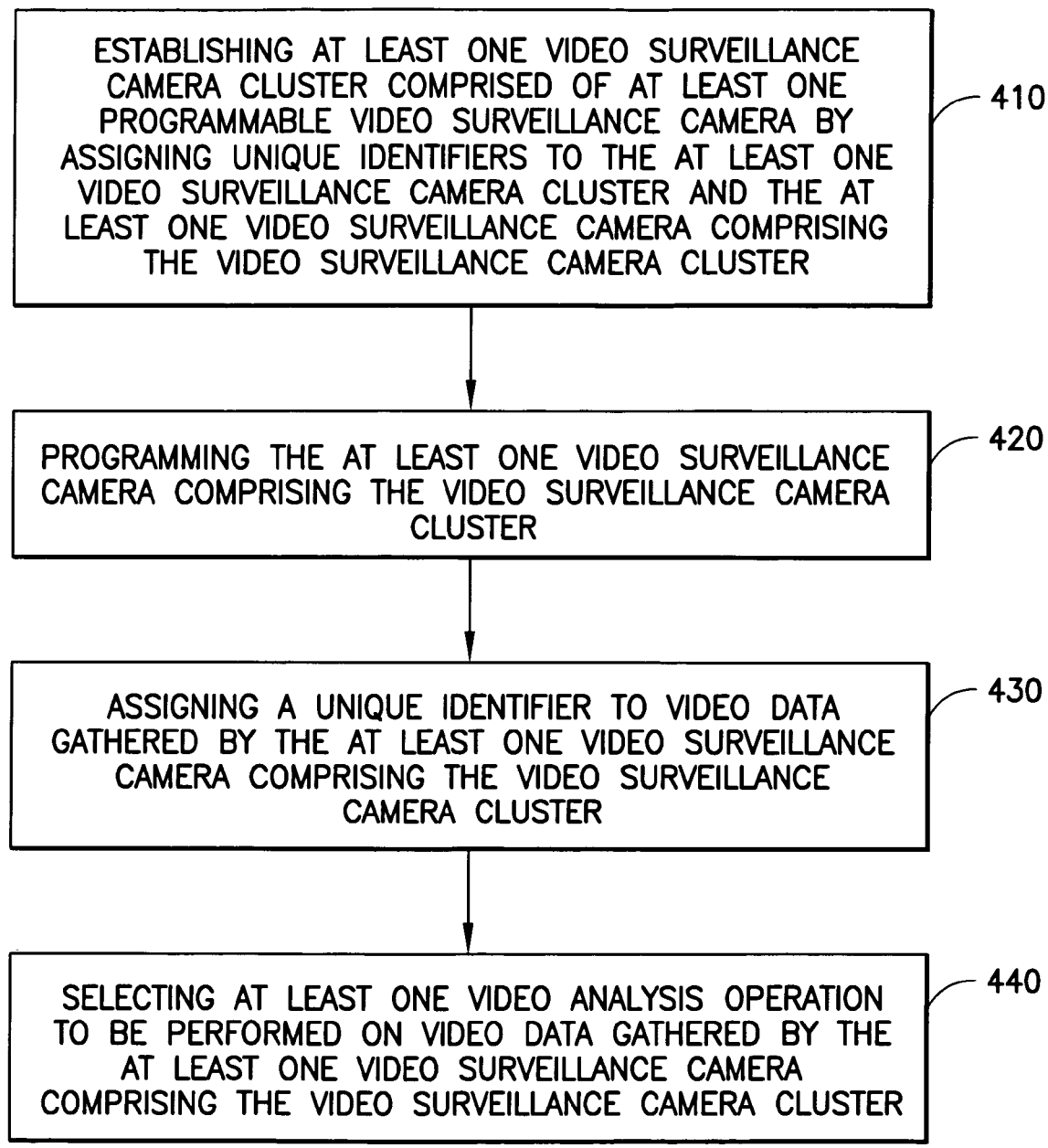
FIG. 6 depicts operations performed by methods and apparatus acting in accordance with the embodiments of the present invention when a modular and extensible video surveillance system is established.

A method according to the present invention, and steps performed by programs and apparatus operating according to the present invention, are depicted in FIG. 6. FIG. 6 generally depicts the steps or operations performed by apparatus and methods operating in accordance with the present invention when a video surveillance system 200 is established. In FIG. 6, the first operation 410 comprises establishing at least one video surveillance camera cluster comprised of at least one programmable video surveillance camera by assigning unique identifiers to the at least one video surveillance camera cluster and the at least one video surveillance camera comprising the video surveillance camera cluster, wherein the unique identifiers will be used in an electronic database system for managing operations of the video surveillance camera cluster and the at least one video surveillance camera comprising the video surveillance camera cluster. The next operation 420 comprises programming the at least one video surveillance camera comprising the video surveillance camera cluster. Then, operation 430 is performed comprising assigning a unique identifier to video data gathered by the at least one video surveillance camera comprising the video surveillance camera cluster, wherein the unique identifier will be used by the database system to catalogue video data gathered by the at least one video surveillance camera when saving the video data for later retrieval. Next at operation 440 at least one video analysis operation to be performed on video data gathered by the at least one video surveillance camera comprising the video surveillance camera cluster is selected.

Figure 7:
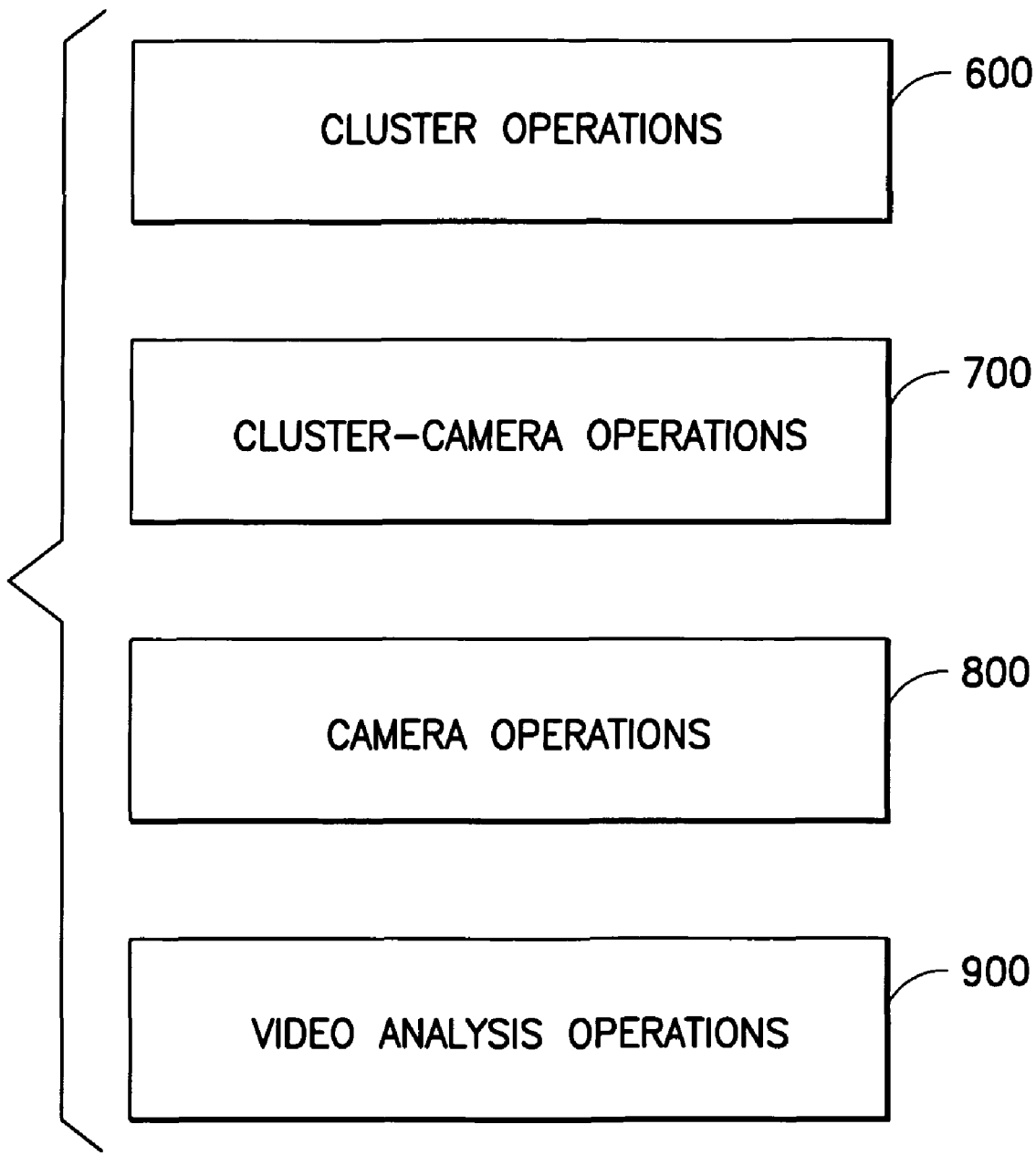
FIG. 7 depicts categories of service protocols available for implementing and managing a modular and extensible video surveillance system in accordance with the present invention.

In addition to the operations depicted in FIG. 6, additional service protocols comprising further operations are available for implementing and managing a video surveillance system 200 operating in accordance with the present invention. In particular, FIG. 7 depicts the general categories in which these various service protocols occur. For example, there are cluster-related operations 600; cluster-camera-related operations 700; camera operations 800; and video analysis operations 900. Specific service protocols appearing in these categories are depicted in FIGS. 8-11.

Figure 8:
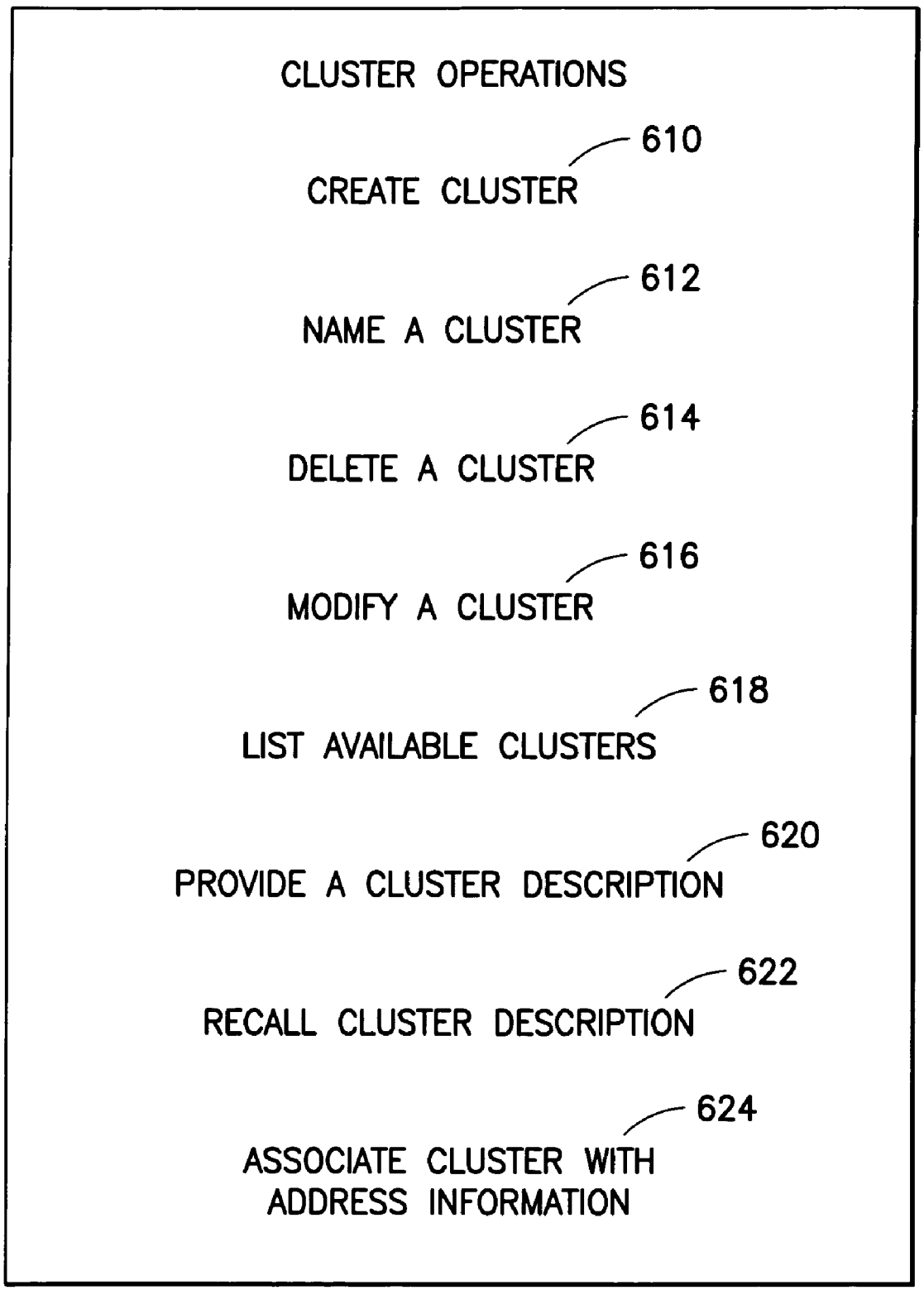
FIG. 8 depicts specific cluster-related service protocols available for implementing and managing a modular and extensible video surveillance system in accordance with the present invention.

The cluster-related service protocols available are depicted in FIG. 8 and comprise protocols for creating a cluster 610; naming a cluster 612; deleting a cluster 614; modifying a cluster 616; listing available clusters 618; providing a cluster description 620; recalling a cluster description 622; and associating a cluster with address information 624. In various embodiments, clusters can be comprised of static cameras; cameras with programmable view capability; or cameras with multiple programmable view capability. In addition, clusters can comprise views selected from several distinct cameras. These operations can be performed in addition to the operations depicted in FIG. 6 for establishing and managing a video surveillance system operating in accordance with the present invention.

The cluster-camera-related protocols available are depicted in FIG. 9 and comprise protocols for adding a video camera to a cluster 710; naming a camera 712; and deleting a camera 714.

Figure 10:
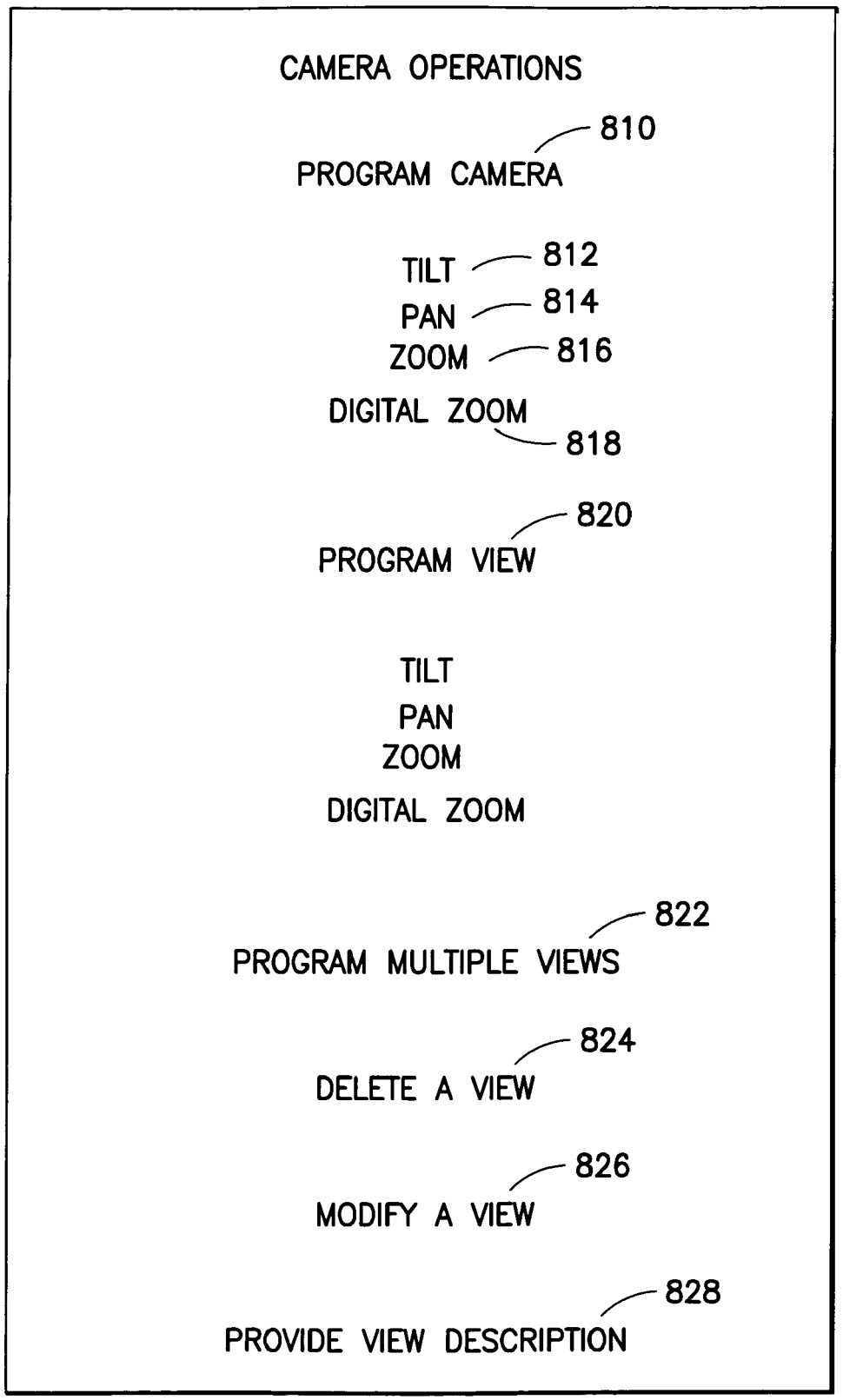
FIG. 10 depicts specific camera-related service protocols available for implementing and managing a modular and extensible video surveillance system in accordance with the present invention.

The video-camera-related protocols are depicted in FIG. 10 and comprise protocols for programming 810 the tilt 812; pan 814; zoom 816; and digital zoom 818 movements or operations of a video surveillance camera; for programming a view of a camera comprised of at least one operation or movement of the video surveillance camera 820; for programming multiple views 822; for deleting a view 824; for modifying a view 826; and for providing a view description 828.

Figure 11:
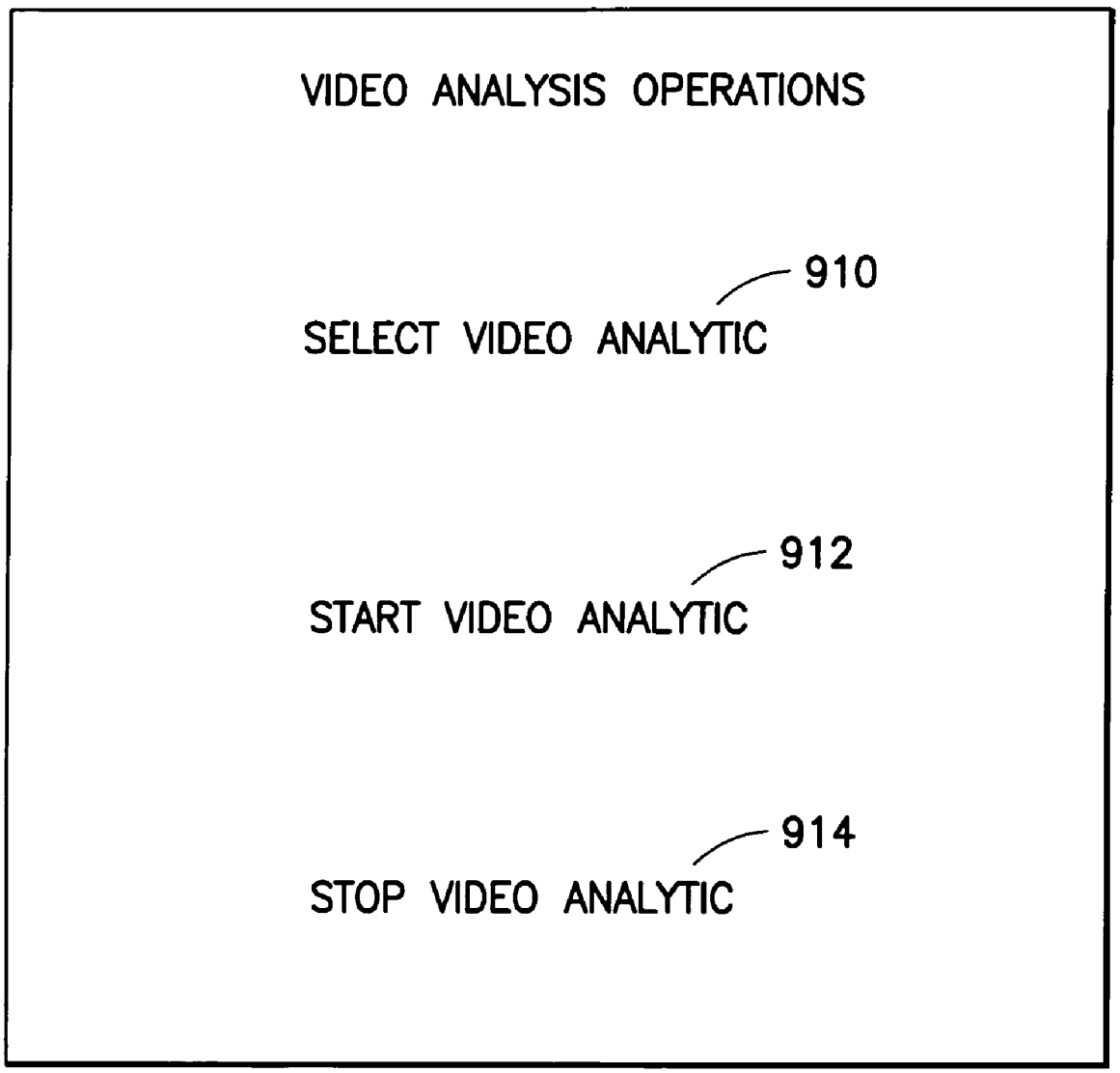
FIG. 11 depicts specific video-analysis-related service protocols available for implementing and managing a modular and extensible video surveillance system in accordance with the present invention.

The video-analysis-related protocols are depicted in FIG. 11 and comprise protocols for selecting video analytics to be performed on the video 910; for starting the video analytics 912 and for stopping the video analytics 914. Video analytics can be applied to a single camera; a cluster of cameras; or a cluster of camera views, as can the operations for controlling video analytics.

Thus it is seen that the foregoing description has provided by way of exemplary and non-limiting examples a full and informative description of the best method and apparatus presently contemplated by the inventors for establishing, implementing, managing and extending a modular and distributed video surveillance system are provided. One skilled in the art will appreciate that the various embodiments described herein can be practiced individually; in combination with one or more other embodiments described herein; or in combination with video surveillance systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A video surveillance system module for use in a distributed and extensible video surveillance system, the video surveillance system module comprising:
    a video surveillance camera, wherein the video surveillance camera is remotely programmable;
    at least one memory comprising computer readable instructions, and at least one processor configured by execution of the computer readable instructions to cause the module to perform the following:
    create a video encoder configured to encode video gathered by the video surveillance camera and to transmit the encoded video to an electronic database system; and
    create a video analysis engine coupled to the video surveillance camera to analyze video gathered by the video surveillance camera, wherein the video analysis engine is configured
        to be programmable to permit a user to specify video analysis criteria;
        to perform activity analysis of the video in accordance with the user-specified video analysis criteria;
        to detect and classify objects and object activity observed by the video surveillance camera;
        to generate data classifying objects and object activity for use by an entity performing surveillance, the data comprising track information comprising at least a pointer providing access to a segment of video satisfying the user-specified video analysis criteria; and
        to transmit the track information, including the pointer providing access to the segment of video satisfying the user-specified video analysis criteria, to the electronic database system.

2. A video surveillance camera cluster comprising:
    at least one video surveillance system module, the video surveillance system module comprising:
        a video surveillance camera, wherein the video surveillance camera is remotely programmable;
        at least one memory comprising computer readable instructions, and at least one processor configured by execution of the computer readable instructions to cause the module to perform the following:
        create a video encoder configured to encode video gathered by the video surveillance camera and to transmit the encoded video to an electronic database system; and create a video analysis engine coupled to the video surveillance camera to analyze video gathered by the video surveillance camera, wherein the video analysis engine is configured to be programmable to permit a user to specify video analysis criteria; to perform activity analysis of the video in accordance with the user-specified video analysis criteria; to detect and classify objects and object activity observed by the video surveillance camera; to generate data classifying objects and object activity for use by an entity performing surveillance, the data comprising track information comprising at least a pointer providing access to a segment of video satisfying video analysis criteria; and to transmit the track information, including the pointer providing access to the segment of video satisfying the user-specified video analysis criteria, to the electronic database system.

3. A video surveillance camera cluster for incorporation in a video surveillance camera system, the video surveillance camera cluster comprising:

a unique identifier for use by the video surveillance camera system to identify the video surveillance camera cluster;

at least one video surveillance system module, the video surveillance system module comprising:

a video surveillance camera, wherein the video surveillance camera is remotely programmable;

at least one memory comprising computer readable instructions, and at least one processor configured by execution of the computer readable instructions to cause the module to perform the following:

create a video encoder configured to encode video gathered by the video surveillance camera and to transmit the encoded video to an electronic database system;

create a video analysis engine coupled to the video surveillance camera to analyze video gathered by the video surveillance camera, wherein the video analysis engine is configured to be programmable to permit a user to specify video analysis criteria; to perform activity analysis of the video in accordance with the user-specified video analysis criteria; to detect and classify objects and object activity observed by the video surveillance camera; to generate data classifying objects and object activity for use by an entity performing surveillance, the data comprising track information comprising at least a pointer providing access to a segment of video satisfying the user-specified criteria; and to transmit the track information, including the pointer providing access to the segment of video satisfying the user-specified video analysis criteria, to the electronic database system; and at least one of an output of a camera controller coupled to the video analysis engine and an output of the video encoder coupled to the video analysis engine is coupled to the electronic database system having at least a database server, a video manager server, an application server, and a surveillance application configured to generate an alarm, wherein the electronic database system is configured to display the data and the video in a browser format.

4. The video surveillance camera cluster of claim 3, wherein the video surveillance camera cluster comprises a plurality of video surveillance system modules, and where each camera comprising each video surveillance system module has a unique identifier for use by the video camera surveillance system in identifying the camera.

5. A video surveillance camera system front end comprising:

a video surveillance camera cluster comprising:

at least one video surveillance system module, the video surveillance system module comprising:

a video surveillance camera, wherein the video surveillance camera is remotely programmable;

at least one memory comprising computer readable instructions, and at least one processor configured by execution of the computer readable instructions to cause the module to perform the following:

create a video encoder configured to encode video gathered by the video surveillance camera and to transmit the encoded video to an electronic database system; and create a video analysis engine coupled to the video surveillance camera to analyze video gathered by the video surveillance camera, wherein the video analysis engine is configured to be programmable to permit a user to specify video analysis criteria; to perform activity analysis of the video in accordance with the user-specified video analysis criteria; to detect and classify objects and object activity observed by the video surveillance camera; to generate data classifying objects and object activity for use by an entity performing a surveillance function, the data comprising track information comprising at least a pointer providing access to a segment of video satisfying the user-specified video analysis criteria; and to transmit the track information, including the pointer providing access to the segment of video satisfying the user-specified video analysis criteria, to the electronic database system;

at least one video surveillance system network coupled to the at least one video surveillance system module; and a remote video surveillance system control interface coupled to the at least one video surveillance system network for controlling the operations of the at least one video surveillance system module.

6. The video surveillance camera system front end of claim 5, where the video surveillance camera has a panning function, and where the remote video surveillance system control interface further comprises a camera panning function programming module for permitting a user to program remotely the panning function of the video surveillance camera.

7. The video surveillance system front end of claim 5, where the video surveillance camera has a tilting function, and where the remote video surveillance system control interface further comprises a camera tilting function programming module for permitting a user to program remotely the tilting function of the video surveillance camera.

8. The video surveillance system front end of claim 5, where the video surveillance camera has a zoom function, and where the remote video surveillance system control interface further comprises a camera zoom function programming module for permitting a user to program remotely the zoom function of the video surveillance camera.

9. The video surveillance system front end of claim 5, where the video surveillance camera has a digital zoom function, and where the remote video surveillance system control interface further comprises a digital zoom function programming module for permitting a user to program remotely the digital zoom function of the video surveillance camera.

10. The video surveillance system front end of claim 5, where the video surveillance camera has a multiple view function, wherein each of the views comprises one or more of operations or movements of the video surveillance camera, and where the remote video surveillance system control interface further comprises a camera view function programming module for permitting a user to program remotely the multiple view function of the video surveillance camera.

11. The video surveillance system front end of claim 10, where the operations of the video surveillance camera comprises at least a zoom operation.

12. The video surveillance system front end of claim 10, where the operations of the video surveillance camera comprises at least a digital zoom operation.

13. The video surveillance system front end of claim 10, where the movements of the video surveillance camera comprises at least a panning movement.

14. The video surveillance system front end of claim 10, where the movements of the video surveillance camera comprises at least a tilting movement.

15. A computer memory medium tangibly embodying a program of machine-readable instructions executable by a digital processing apparatus of a computer system to perform operations, the operations comprising:
   establishing at least one video surveillance camera cluster comprised of at least one video encoder, at least one video analysis engine, and a plurality of video surveillance cameras by assigning unique identifiers to the at least one video surveillance camera cluster and the plurality of video surveillance cameras, wherein the unique identifiers will be used in an electronic database system for managing operations of the at least one video surveillance camera cluster and the plurality of video surveillance cameras;
   programming at least one of the plurality of video surveillance cameras in the at least one video surveillance camera cluster;
   receiving encoded video data from the at least one video encoder in the at least one video surveillance camera cluster, the encoded video data corresponding to at least one of the plurality of video surveillance cameras in the at least one video surveillance camera cluster;
   assigning a unique identifier to the encoded video data gathered by the at least one video surveillance camera and encoded by the corresponding encoder in the at least one video surveillance camera cluster, wherein the unique identifier will be used by the database system to catalogue video data gathered by the corresponding video surveillance camera when saving the video data for later retrieval; and
   selecting at least one video analysis operation to be performed on video data gathered by the at least one video surveillance camera in the at least one video surveillance camera cluster, wherein selecting comprises permitting a user to specify video analysis criteria, and wherein the video analysis operation comprises:
   performing activity analysis of the video data in accordance with the user-specified video analysis criteria;
   identifying and categorizing objects and object activity observed by the at least one video surveillance camera; and
   generating data identifying and classifying objects and object activity for use by an entity performing a surveillance function, the data comprising track information comprising at least a pointer providing access to a segment of video data satisfying the user-specified video analysis criteria;
   causing the video surveillance camera cluster to perform the operations of performing activity analysis, identifying and categorizing, and generating data; and
   causing the video surveillance camera cluster to transmit the track information, including the pointer providing access to the segment of video satisfying the user-specified video analysis criteria, to the computer system;
   receiving the track information; and
   using at least the track information to display corresponding video to the user.

16. The computer memory medium of claim 15 wherein there are
   at least two video surveillance camera clusters, and where the operations further comprise:
   listing the unique identifiers of each of the at least two video surveillance camera clusters.

17. The computer memory medium of claim 15 where the operations further comprise:
   assigning a description of the properties of the at least one video surveillance camera cluster to the at least one video surveillance camera cluster; and
   saving the description in the electronic database system.

18. The computer memory medium of claim 17 where the operations further comprise:
   retrieving the description of the properties of the at least one video surveillance camera cluster from the database.

19. The computer memory medium of claim 15 where the operations further comprise:
   deleting the at least one video surveillance camera cluster.

20. The computer memory medium of claim 15 where the operations further comprise:
   adding a new video surveillance camera to the at least one video surveillance camera cluster by assigning a unique identifier to the new video surveillance camera.

21. The computer memory medium of claim 20 where the operations further comprise:
   deleting at least one of the video surveillance cameras from the video surveillance camera cluster.

22. The computer memory medium of claim 15 where the operations further comprise:
   assigning a description of the properties of the at least one video surveillance camera comprising the video surveillance camera cluster to that video surveillance camera; and
   saving the description in the electronic database system.

23. The computer memory medium of claim 22 where the operations further comprise:
   retrieving the description of the properties of the at least one video surveillance camera.

24. The computer memory medium of claim 15 wherein programming the at least one video surveillance camera further comprises:
   programming a pan control of the video surveillance camera.

25. The computer memory medium of claim 15 wherein programming the at least one video surveillance camera further comprises:
   programming a tilt control of the video surveillance camera.

26. The computer memory medium of claim 15 wherein programming the at least one video surveillance camera further comprises:
   programming a zoom control of the video surveillance camera.

27. The computer memory medium of claim 15 wherein programming the at least one video surveillance camera further comprises:
   programming a digital zoom control of the video surveillance camera.

28. The computer memory medium of claim 15 wherein programming the at least one video surveillance camera further comprises:
  defining at least one view for the at least one video surveillance camera comprising the at least one video surveillance camera cluster, wherein the view corresponds to at least one of programmed operations or movements of the video surveillance camera.

29. The computer memory medium of claim 28 where the operations of the at least one video surveillance camera corresponds to at least a zoom operation.

30. The computer memory medium of claim 28 where the operations of the at least one video surveillance camera corresponds to at least a digital zoom operation.

31. The computer memory medium of claim 28 where the movements of the at least one video surveillance camera corresponds to at least a pan movement.

32. The computer memory medium of claim 28 where the movements of the at least one video surveillance camera corresponds to at least a tilt movement.

33. The computer memory medium of claim 28 wherein programming the at least one video surveillance camera further comprises:
  defining multiple views for the at least one video surveillance camera.

34. The computer memory medium of claim 28 where the operations further comprise:
  demonstrating the at least one programmed view of the at least one video surveillance camera by displaying real-time feeds of video gathered by the at least one video surveillance camera on a display as the video surveillance camera perform the operations and movements comprising the at least one programmed view.

35. The computer memory medium of claim 15 where the operations further comprise:
  starting the at least one selected video analysis operation.

36. The computer memory medium of claim 35 where the operations further comprise:
  stopping the at least one selected video analysis operation.

37. The computer memory medium of claim 28 where the operations further comprise:
  assigning a unique identifier to the at least one view; and
  saving the unique identifier to the electronic database system.

38. The computer memory medium of claim 33 where the operations further comprise:
  assigning a unique identifier to each of the multiple views programmed for the at least one video surveillance camera; and
  saving the unique identifiers to the electronic database system.

39. The computer memory medium of claim 38 where the operations further comprise:
  retrieving the unique identifiers corresponding to the programmed views from the electronic database system.

40. The computer memory medium of claim 28 where the operations further comprise:
  assigning a description of the properties of the at least one view for the at least one video surveillance camera to the respective at least one view; and
  saving the description of the at least one view to the electronic database system.

41. The computer memory medium of claim 36 where the operations further comprise:
  retrieving the description of the at least one view of the at least one video surveillance camera from the electronic database system.

42. The computer memory medium of claim 33 wherein the operations further comprise:
  deleting at least one of the multiple programmed views.

43. The computer memory medium of claim 28 wherein the operations further comprise:
  updating the at least one view programmed for the at least one video surveillance camera comprising the at least one video surveillance camera cluster by modifying the programmed operations or movements corresponding to the at least one view.

44. The computer memory medium of claim 33 wherein the operations further comprise:
  listing the available views for the at least one video surveillance camera.

45. The computer memory medium of claim 15 wherein the operations further comprise:
  associating the at least video surveillance camera cluster with address information; and
  saving the associated address information to the electronic database system.

46. The computer memory medium of claim 45 wherein the address information comprises campus information.

47. The computer memory medium of claim 45 wherein the address information comprises street address information.

48. The computer memory medium of claim 45 wherein the address information comprises a building name.

49. The computer memory medium of claim 45 wherein the address information comprises city information.

50. The computer memory medium of claim 45 wherein the address information comprises state information.

51. The computer memory medium of claim 45 wherein the address information comprises building entrance information.

52. The computer memory medium of claim 45 wherein the operations further comprise:
  deleting the address information.

53. The computer memory medium of claim 15, wherein:
  establishing comprises establishing a plurality of video surveillance camera clusters, each cluster comprised of at least one video surveillance camera; and
  the video analysis operation is applied to the plurality of video surveillance camera clusters.

* * * * *